Feb. 14, 1933. H. CAVE 1,897,968
BRUSH MAKING MACHINE
Filed Feb. 21, 1929
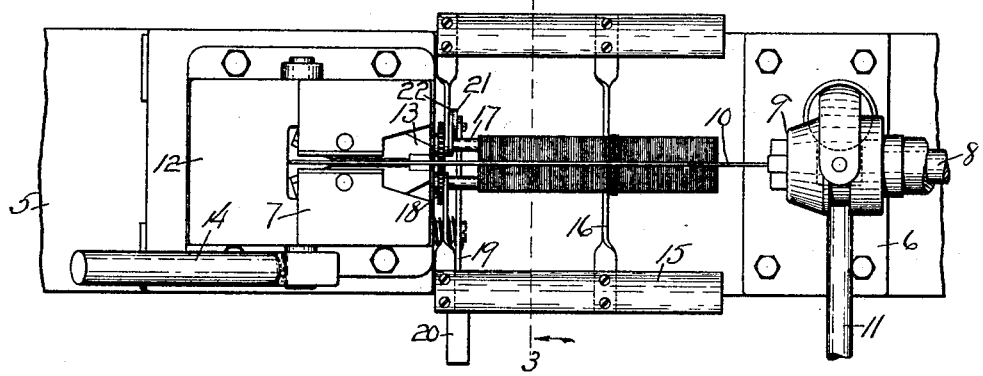
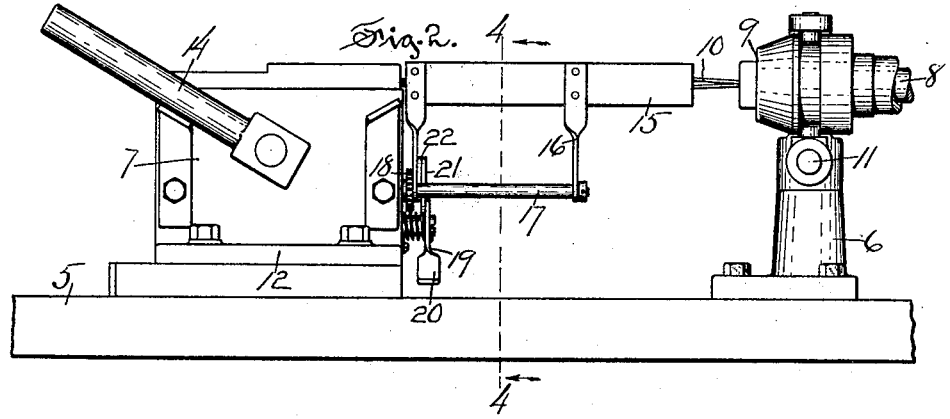
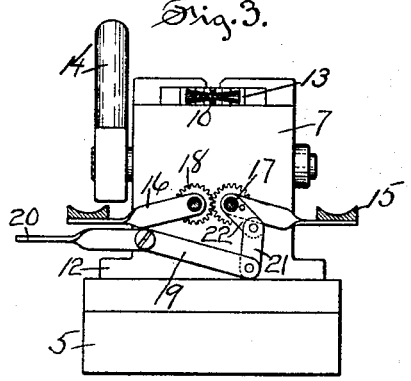
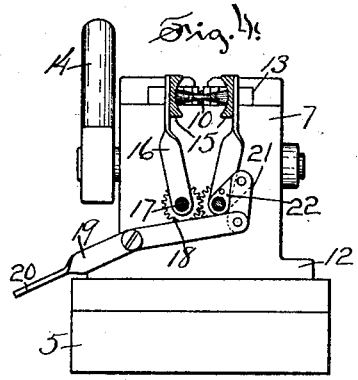
INVENTOR
Henry Cave,
by
Arthur Jenkins,
ATTORNEY Patented Feb. 14, 1933

1,897,968

UNITED STATES PATENT OFFICE

HENRY CAVE, OF HARTFORD, CONNECTICUT, ASSIGNOR TO THE FULLER BRUSH COMPANY, OF HARTFORD, CONNECTICUT, A CORPORATION OF CONNECTICUT

BRUSH MAKING MACHINE

Application filed February 21, 1929. Serial No. 341,638.

My invention relates to that class of machines, in the operation of which, brush material, as bristles, are secured between wires twisted together to form a core, and an object of my invention, among others, is the production of a machine of this type that shall be simple in construction and particularly rapid and efficient in operation.

One form of a machine embodying my invention and in the construction and use of which the objects herein set out, as well as others, may be attained is illustrated in the accompanying drawing, in which—

Figure 1 is a top view of a portion of a machine embodying my invention, with eveners shown in inoperative positions.

Figure 2 is a side view but with the eveners shown in their operative positions.

Figure 3 is a view in section on a plane denoted by the dotted line 3—3 of Figure 1.

Figure 4 is a similar view and as denoted by the dotted line 4—4 of Figure 2.

In the accompanying drawing the numeral 5 indicates the bed or base of my improved machine that may be supported in any usual manner, as upon a bench or other structure. A head stock 6 is secured to the base near one end and a tail stock 7 is mounted on the base in spaced relation with respect to the head stock. The head stock comprises a spindle 8 that may be rotated in any ordinary manner, said spindle having a chuck 9 at its end of ordinary form and provided with chuck jaws for grasping wires 10 that are to be twisted by the operation of the machine. A chuck actuating lever 11 is pivotally mounted on the head stock and is connected with the chuck for the purpose of opening and closing the chuck jaws.

The tail stock 7 is mounted for a limited sliding movement upon a tail stock base 12, being held at the backward limit of its play as by means of a weight (not herein shown). As the wires shorten in the twisting operation the tail stock is permitted forward movement to accommodate itself of the shortening of the wires. Chuck jaws 13 are operatively mounted in the tail stock for the purpose of holding the ends of the wires while the twisting operation is being effected by the operation of the chuck 9. A chuck actuating lever 14 of any ordinary form is connected with the chuck jaws 13 for the purpose of operating them.

All of the parts thus far described are of old and well-known construction, and, except in connection with my improved mechanism now to be described, form no part of my present invention.

In carrying my invention into effect I provide a pair of eveners 15 secured at the ends of evener supporting arms 16, which arms are in turn supported by evener actuating shafts 17 freely, rotatably mounted in the tail stock and projecting therefrom into the space between the head and tail stocks. Pinions 18 are secured to each of said shafts, the teeth of said pinions intermeshing one with the other.

The arms 16 are of such length that the eveners 15, when in their raised or operative positions, will be located opposite each other and on opposite sides of the wires 10 held by the chucks in the head and tail stocks. These eveners are preferably composed of wood, or other comparatively light material, and they are concave on their facing sides.

In operation two wires 10 are placed between the jaws of the head and tail stocks and the jaws of the head stock are clamped to secure said wires. A bunch of bristles or similar brush material is now placed between the wires, the top wire being sprung away from the other wire to permit the insertion of the bunch, and the material is spread evenly upon the supporting wire. Prior to my invention, at this point, it has been common practice for the operator to take a block of wood in each hand and press them simultaneously against opposite ends of the brush material, thus evening them up.

By the use of my improved machine, this operation of taking up the blocks, pressing them against opposite ends of the material and then laying the blocks down is done away with, but in place thereof, the eveners are swung upwardly simultaneously into contact with the opposite ends of the brush material, and by reason of the interconnection of the eveners by means of pinions 18, the material is distributed so that it will be projected evenly and to the same extent on opposite sides of the wires. When the material has thus been "evened up" the wires are clamped between the jaws of the tail stock and the spindle 8 is then caused to rotate to twist the wires and secure the material therebetween, the tail stock moving toward the head stock in this operation, and as hereinbefore mentioned.

As a convenient means for operating the eveners I provide an evener actuator lever 19 pivotally attached to the tail stock and having a hand-piece 20 at one end by means of which it may be operated and a link 21 pivotally attached at its opposite end and connecting said lever with an actuating arm 22, said arm being rigidly secured to one of the shafts 17.

From this it will be readily seen that when the hand-piece 20 is pressed downwardly, as by the hand of the operator, the eveners 15 will be swung upwardly into their operative positions, and as shown in Figures 2 and 4 of the drawing, and, when released, the eveners will fall to their inoperative positions and as shown in Figures 1 and 3 of the drawing.

It will be noted that the eveners may be so relatively positioned when assembling the device that they may be caused to engage opposite ends of the brush material in any predetermined relative positions, so that the brush material may be evenly projected on opposite sides of the wires, or otherwise, as may be desired.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim—

1. A brush making machine including means for twisting wires together with brush material between them, and a pair of eveners movably mounted to engage the ends of said brush material on opposite sides of said wires to project said material to a predetermined extent on opposite sides of said wires.

2. A brush making machine including means for twisting wires together with brush material between them, a pair of eveners movably mounted to engage the ends of said brush material on opposite sides of said wires, and means for effecting a predetermined relative positioning of said eveners when engaged with said brush material.

3. A brush making machine including means for twisting wires together with brush material between them, arms pivotally movable relatively to said twisting means, and an evener secured to each of said arms.

4. A brush making machine including means for twisting wires together with brush material between them, a pair of eveners movably mounted to engage the ends of said brush material on opposite sides of said wires, and interconnecting means between said eveners to effect simultaneous movement of both.

5. A brush making machine including means for twisting wires together with brush material between them, a pair of arms pivotally movable relatively to said twisting means, an evener secured to each of said arms to be swung thereby into positions on opposite sides of said wires, and a pair of interengaging pinions to effect simultaneous swinging movement of said arms.

6. A brush making machine including means for twisting wires together with brush material between them, a pair of eveners movably mounted to engage the ends of said brush material on opposite sides thereof, and manually operated means connected with said eveners to effect simultaneous movement thereof.

7. A brush making machine including means for twisting wires together with brush material between them, a pair of arms pivotally movable relatively to said twisting means, rock shafts to which said arms are secured, interengaging pinions secured to said rock shafts, and a manually actuated lever operatively connected with one of said shafts.

8. A brush making machine including means for twisting wires together with brush material therebetween, and means for evening the brush material movable into and out of engagement with the said material when stationary and before twisting of the wires to even the ends of said material.

9. A brush making machine including means for twisting wires together with brush material therebetween and means located on each side of the wire twisting means movable into and out of engagement with the brush material when stationary and before twisting of the wires for evening said material.

10. A brush making machine including means for holding a layer of brush material between a plurality of wires, means located on each side of the holding means movable into and out of engagement with the brush material for evening the latter, and means for operating said evening means simultaneously.

11. A machine of the type described including a tail stock, a pair of shafts journaled in said tail stock, means for rotating said shafts, and bristle evening members carried by each shaft.

12. A machine of the type described including relatively movable head and tail stocks, a pair of shafts journaled in one of said stocks, means for rotating said shafts, and a bristle evener member carried by each shaft.

13. In a brush making machine, a base, a pair of shafts, means carried by the base for rotatably supporting said shafts, and an evener member carried by each shaft.

14. In a brush making machine, a pair of shafts, means for rotatably suporting said shafts in parallelism, and a bristle evener member carried by each shaft.

15. A brush making machine including means for twisting wires together with brush material therebetween, and means for evening the brush material movable into and out of engagement with the latter, said last mentioned means including a pair of parallel evener members concaved on their facing sides.

HENRY CAVE.